US009749266B2

(12) United States Patent
Steinmacher-Burow

(10) Patent No.: US 9,749,266 B2
(45) Date of Patent: Aug. 29, 2017

(54) COALESCING MESSAGES USING A NETWORK INTERFACE CONTROLLER

(71) Applicant: International Business Machines Corporation, Armonk, NY (US)

(72) Inventor: Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 14/838,946

(22) Filed: Aug. 28, 2015

(65) Prior Publication Data

US 2017/0064051 A1    Mar. 2, 2017

(51) Int. Cl.
*H04L 12/28* (2006.01)
*H04L 12/861* (2013.01)
*H04L 12/741* (2013.01)
*H04L 29/06* (2006.01)

(52) U.S. Cl.
CPC .............. *H04L 49/90* (2013.01); *H04L 45/74* (2013.01); *H04L 69/22* (2013.01)

(58) Field of Classification Search
CPC ......... H04L 45/64; H04L 49/90; H04L 45/74; H04L 69/22
USPC ........................................................ 370/392
See application file for complete search history.

(56) References Cited

U.S. PATENT DOCUMENTS

| 8,036,246 | B2 | 10/2011 | Makineni et al. | |
| 2007/0115982 | A1* | 5/2007 | Pope | H04L 45/742 370/392 |
| 2008/0232364 | A1 | 9/2008 | Beverly | |
| 2009/0006663 | A1 | 1/2009 | Archer et al. | |
| 2014/0036928 | A1* | 2/2014 | Roy | G06F 13/385 370/412 |
| 2014/0185616 | A1* | 7/2014 | Bloch | G06F 9/45533 370/392 |
| 2015/0271244 | A1* | 9/2015 | Bloch | H04L 67/02 709/217 |
| 2016/0043965 | A1* | 2/2016 | Goldenberg | H04L 47/801 709/225 |

OTHER PUBLICATIONS

Bhagvat, S., "Designing and Enhancing the Sockets Direct Protocol (SDP) Over iWARP and InfiniBand," Thesis, Degree Master of Science, The Ohio State University, 2006, 70 pages http://nowlab.cse.ohio-state.edu/NOW/msthesis/bhagvet_thesis.pdf.
Koop et al., "Reducing Connection Memory Requirements of MPI for InfiniBand Clusters: A Message Coalescing Approach," CCGRID'07: Seventh IEEE International Symposium on Computing and the Grid, 2007, © 2007 IEEE, 8 pages, DOI: 10.1109/CCGRID.2007.92.

(Continued)

*Primary Examiner* — Faisal Choudhury
(74) *Attorney, Agent, or Firm* — Robert J. Shatto

(57) ABSTRACT

An injection descriptor corresponding to a destination node may be stored in memory. A network interface controller (NIC) may determine that one or more messages added to the injection descriptor are to be transmitted to the destination node. The NIC may then lock the injection descriptor so that no additional message can be added to the injection descriptor, and the NIC may load the one or more messages. The NIC may then generate a network packet that includes the one or more messages, and the NIC may transmit the network packet to the destination node.

18 Claims, 5 Drawing Sheets

(56) References Cited

OTHER PUBLICATIONS

Koop, M., "High-Performance Multi-Transport MPI Design for Ultra-Scale InfiniBand Clusters," Dissertation, Degree Doctor of Philosophy, The Ohio State University, 2009, 211 pages http://nowlab.cse.ohio-state.edu/NOW/dissertation/koop.pdf.

Unknown, "Nagle's algorithm," Wikipedia, the free encyclopedia, 2 pages, http://en.wikipedia.org/wiki/Nagle's_algorithm.

Unknown, "Network interface controller," Wikipedia, the free encyclopedia, 2 pages http://en.wikipedia.org/wiki/Network_interface_controller.

Willcock et al., "AM++: A Generalized Active Message Framework," PACT'10: Proceedings of the 19th International Conference on Parallel Architectures and Compilation Techniques, Sep. 2010, 10 pages, Copyright 2010 ACM, http://htor.inf.ethz.ch/publications/img/willcock-amplusplus.pdf.

* cited by examiner

COALESCING MESSAGES USING A NETWORK INTERFACE CONTROLLER

BACKGROUND

The present disclosure relates generally to the field of network computing, and more particularly to coalescing messages into a network packet using a network interface controller (NIC).

A source node may inject network packets into a network using a NIC. The network packets often contain a single network message generated by an application or software thread. Accordingly, injected network packets are often much smaller than the maximum packet size that can be sent to the destination node.

SUMMARY

Embodiments of the present disclosure include a method, computer program product, and system for coalescing messages into a network packet using a network interface controller (NIC). An injection descriptor corresponding to a destination node may be stored in memory. The NIC may determine that one or more messages added to the injection descriptor are to be transmitted to the destination node. The NIC may then lock the injection descriptor so that no additional message can be added to the injection descriptor, and the NIC may load the one or more messages. The NIC may then generate a network packet that includes the one or more messages, and the NIC may transmit the network packet to the destination node.

In various embodiments, an application may generate a message to be sent to a destination node. The application may add the message to a set of memory addresses associated with an injection descriptor that corresponds to the destination node. The application may then determine that the message is the only message added to the set of memory address associated with the injection descriptor. The application may then add a pointer identifying the injection descriptor to an injection queue served by the NIC.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
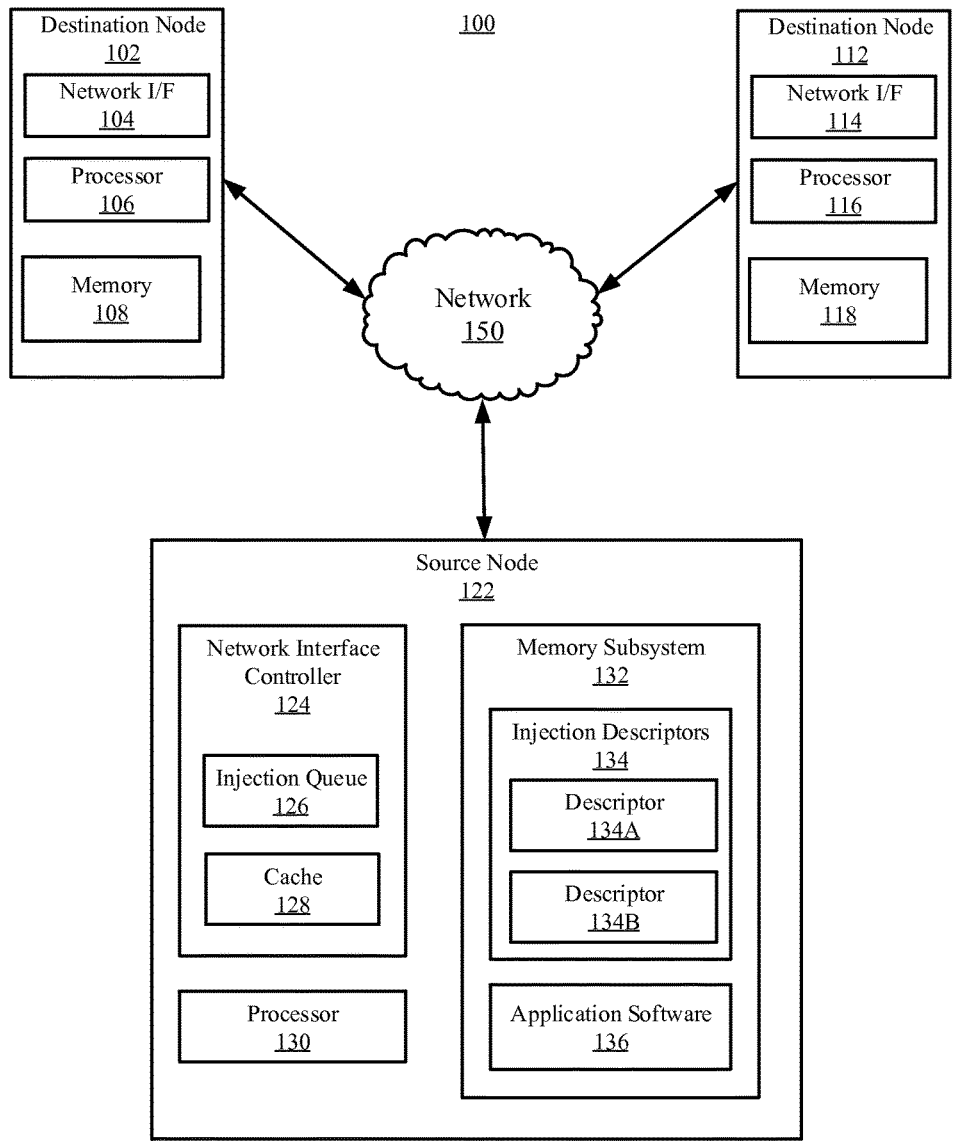
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of network computing, and in particular to coalescing messages into a network packet using a network interface controller (NIC). While the present disclosure is not necessarily limited to such applications, various aspects of the disclosure may be appreciated through a discussion of various examples using this context.

A source node may inject network packets into a network using a NIC. The network packets often contain a single network message generated by an application or software thread. Accordingly, injected network packets are often much smaller than the maximum packet size that can be sent to the destination node. Because network packets also contain a header (e.g., a 40 byte header for TCP/IP packets), also known as an envelope, there can be a huge overhead in having many small messages sent, each in its own packet, instead of in a single, larger packet. For example, the payload (e.g., message) generated by a software thread may be only 2 bytes. If the software thread generates 5 of these messages, the total amount of data that is injected into the network may be 210 bytes (5 headers×40 bytes per header and 5 messages×2 bytes per message). If the messages were coalesced into a single network packet, the total amount of data injected into the network may be smaller (e.g., around 50 bytes).

In some embodiments of the present disclosure, a computer system may generate and coalesce two or more messages into a single network packet. An application or software thread may generate a message to be sent to a destination node over a network. The application may add the message to an injection descriptor (e.g., a data descriptor used to store messages that are being transmitted to a particular destination node). Two or more messages may be added to the injection descriptor by one or more applications or software threads. A pointer identifying the injection descriptor may be added to an injection queue (e.g., a queue of messages to be injected into a network by the NIC).

When the pointer identifying the injection descriptor is at the front of the queue (e.g., next to be processed), the NIC may lock the injection descriptor so that no other applications or software threads can add a message to the injection descriptor. The NIC may then load the messages into cache, clear and unlock the injection descriptor, and coalesce the messages into a network packet. The NIC may have direct memory access to the memory that stores the injection descriptor so that it is able to directly load messages from the memory without the messages having to be routed through the computer processor. The NIC may then transmit the network packet to the destination node by injecting the packet into the network.

Various embodiments of the present disclosure can be viewed as creating three new processor instruction. For example, a first processor instruction may be referred to as an add_message_to_descriptor processor instruction. The add_message_to_descriptor instruction is a store-and-load-like atomic memory operation that can be used to add messages generated by an application or software thread to a data descriptor (referred to herein as an injection descriptor). Specifically, the add_message_to_descriptor instruction allows a software application to add a message (or a pointer to the message) that it is going to be transmitted to a destination node to memory (e.g., cache lines) associated with the injection descriptor. A software application using the add_message_to_descriptor instruction may receive a reply indicating that the message was successfully added to the data descriptor and is the first message added, the message was successfully added to the data descriptor and is not the first message added, or the message could not be added to the data descriptor.

The second and third processor instructions may be referred to as, e.g., a lock_descriptor instruction and an unlock_descriptor instruction. Both the lock_descriptor and unlock_descriptor instructions may be atomic store-like memory operations using by, e.g., a NIC to lock a data descriptor (e.g., prevent additional messages from being added to the data descriptor) and to unlock the data descriptor (e.g., start allowing applications to add additional messages to the data descriptor), respectively. For example, the lock_descriptor instruction may cause all unused (e.g., zeroed) memory addresses (e.g., cache lines) associated with the data descriptor to be changed to all ones. If an application tries to add a message to a locked data descriptor, the add may fail because all memory address associated with the data descriptor may appear to store other messages. On the other hand, the unlock_descriptor instruction may cause each memory address associated with the data descriptor appear available by, e.g., zeroing the memory addresses.

Turning now to the figures, FIG. 1 illustrates a block diagram of an example computing environment 100 in which illustrative embodiments of the present disclosure may be implemented. In some embodiments, the computing environment 100 may include two destination nodes 102 and 112 and a source node 122. The source node 122 may generate messages to be sent to the destination nodes 102 and 112 through the network 150, consistent with embodiments of this disclosure. The distinction between source nodes and destination nodes is used for illustrative purposes, and, in some embodiments, each node may be configured to act as a source node (e.g., to generate messages) and a destination node (e.g., to receive messages). For example, the source node 122 may act as a destination node for messages sent by other nodes, and the destination nodes 102 and 112 may act as source nodes and generate their own messages.

Consistent with various embodiments, the source node 122 and the destination nodes 102 and 112 may be computer systems. The destination nodes 102 and 112 and the source node 122 may include one or more processors 106, 116, and 130 and one or more memories 108, 118, and 132, respectively. The destination nodes 102 and 112 may be configured to communicate with each other through an internal or external network interface 104 and 114. The network interfaces 104 and 114 may be, e.g., modems or network interface cards. The source node 122 may be configured to communicate with the destination nodes 102 and 112 using a network interface controller (NIC) 124.

The NIC 124 may have direct memory access (DMA) to memory 132. The NIC 124 may include an injection queue 126 and a cache 128. The injection queue 126 may be, e.g., a first-in, first-out (FIFO) buffer in which applications (such as application software 136 running on processor 130) can add messages to be processed and transmitted by the NIC 124 to a destination node. In order to process messages, which may be saved by the application 136 into the system memory 132, the NIC may first load the messages into its cache 128. In some embodiments, the injection queue 126 and the cache 128 may not be on the NIC 124. For example, the injection queue 126 and the cache 128 may be may be part of the source node's 122 general memory subsystem 132.

The destination nodes 102 and 112 and/or the source node 122 may be equipped with a display or monitor. Additionally, the destination nodes 102 and 112 and/or the source node 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the destination nodes 102 and 112 and/or the source node 122 may be servers, desktops, laptops, or hand-held devices.

The destination nodes 102 and 112 and the source node 122 may be distant from each other and communicate over a network 150. In some embodiments, the source node 122 may be a central hub from which destination nodes 102 and 112 can establish a communication connection, such as in a client-server networking model. Alternatively, the source node 122 and destination nodes 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the destination nodes 102 and 112 and the source node 122 may be local to each other, and communicate via any appropriate local communication medium. For example, the destination nodes 102 and 112 and the source node 122 may communicate using a local area network (LAN), one or more hardwire connections, a wireless link or router, or an intranet. In some embodiments, the destination nodes 102 and 112 and the source node 122 may be communicatively coupled using a combination of one or more networks and/or one or more local connections. For example, the first destination node 102 may be hardwired to the source node 122 (e.g., connected with an Ethernet cable) while the second destination node 112 may communicate with the source node using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

The source node 122 may contain one or more injection descriptors 134A and 134B, herein generically referred to as the injection descriptors 134. The injection descriptors 134 may be data descriptors that identify or store messages to be sent to a particular destination node. The injection descriptors may each have an amount of corresponding memory to store messages or pointers to messages. For example, each injection descriptor may have a number of cache lines (or memory addresses) in which an application can add a message to be sent to a corresponding destination node. Each of the injection descriptors 134 may correspond to a different destination node. For example, the first injection descriptor 134A may correspond to the first destination node 102 (e.g., store messages that are to be sent to the first destination node), and the second injection descriptor 134B may correspond to the second destination node 112 (e.g., store messages that are to be sent to the second destination node).

The source node 122 may also contain an application 136. The application 136 may be a software application that is configured to generate messages to be sent to a destination node. The application 136 may also be configured to add the messages to one or more injection descriptors 134. For example, the application 136 may generate a message to be sent to the first destination node 102. Instead of adding the message directly to the injection queue 126 serviced by the NIC 124, the application may add the message to memory (e.g., cache lines) associated with the first injection descriptor 134A. In some embodiments, the application 136 may add a pointer to its message to the injection descriptors 134. In other embodiments, the application 136 may add the contents of the message (e.g., the payload) to the injection descriptor 134.

While FIG. 1 illustrates a computing environment 100 with a single source node 122 and two destination nodes 102 and 112, suitable computing environments for implementing embodiments of this disclosure may include any number of destination nodes and source nodes. In some embodiments, each node may act as both a destination node and a source node. For example, the first destination node 102 may, in addition to receiving messages from the source node 122, generate its own message(s) to transmit to the second destination node 112, or to the source node 122. The various modules, systems, and components illustrated in FIG. 1 may exist, if at all, across a plurality of source nodes and destination nodes It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
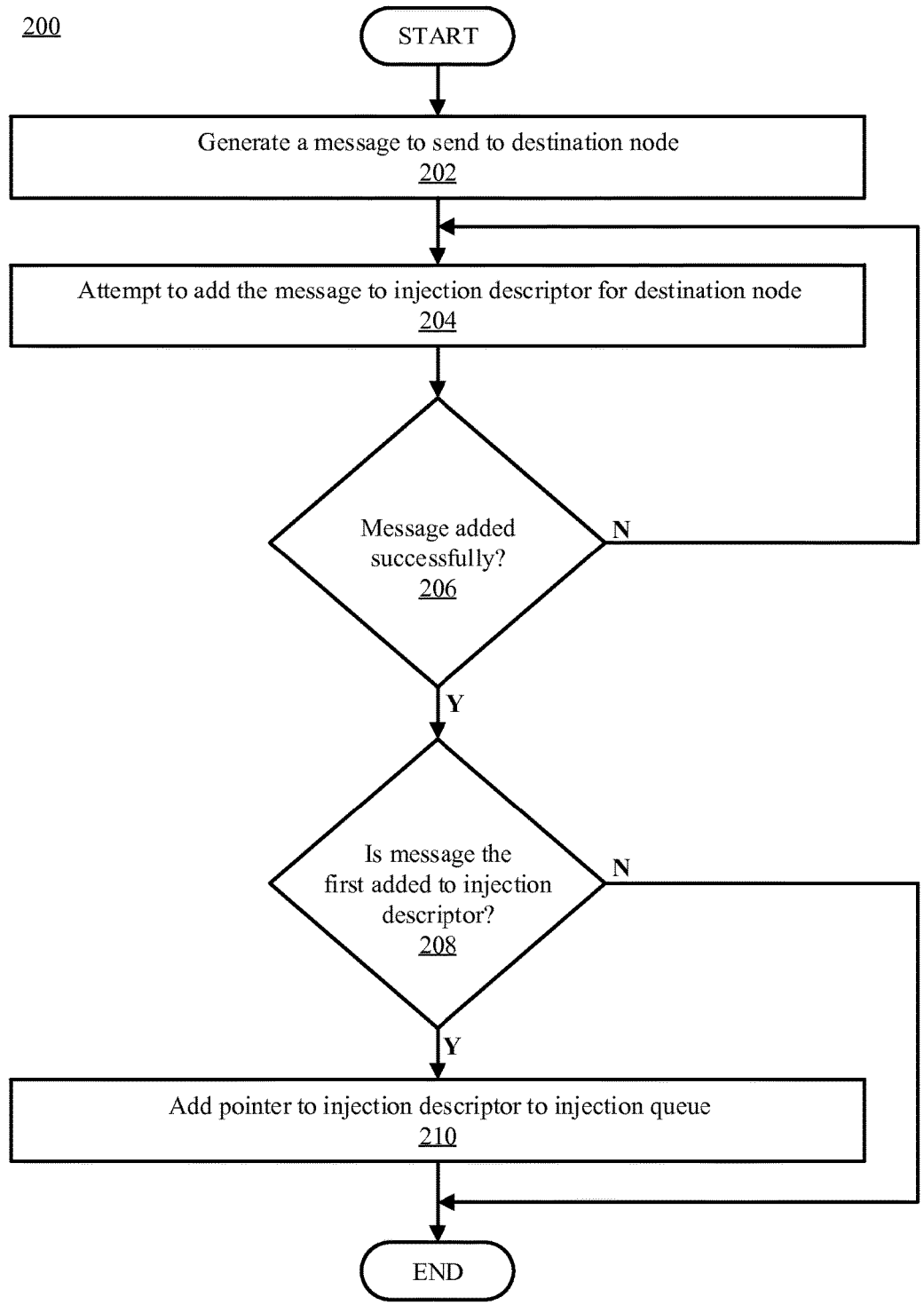
FIG. 2 illustrates an exemplary method for adding network messages to injection descriptors, in accordance with embodiments of the present disclosure.

Referring now to FIG. 2, shown is an exemplary method 200 for adding network messages to injection descriptors, in accordance with embodiments of the present disclosure. The method 200 may be performed by an application on a computer system, such as the source node 122 discussed in reference to FIG. 1. In some embodiments, the method 200 may be performed by a software thread within an application. The method 200 may begin at operation 202, where a software application on the computer system may generate a message to send to a destination node.

After generating a message to send at operator 202, the application may attempt to add the message to an injection descriptor for the destination node at operation 204. In some embodiments, the application may attempt add the contents of the message (e.g., the payload) to memory (e.g., cache lines) associated with the injection descriptor. In other embodiments, the application may attempt to add a pointer to the injection descriptor. The pointer may identify where in memory the message is stored.

In some embodiments, the application may use an atomic memory operation (AMO) to add the message to the injection descriptor. The use of an AMO may prevent the NIC (or other applications) from accessing the injection descriptor while the application is adding its message to the injection descriptor. In some embodiments, the application may use a store-like AMO to add the message to the injection descriptor.

In some embodiments, the application may use a compare-and-swap operation instead of an atomic store operation to add the message to the injection descriptor. Compare-and-swap is a single atomic operation which compares the contents of a memory location to an expected value and, only if they are the same, modifies the contents of that memory location to a new value. In some embodiments, the compare-and-swap operation may return the original value of the memory location. The application may first read a memory location associated with the injection descriptor to determine an expected value used in the compare-and-swap operation used to attempt to add a message. The application may then compare the compare-and-swap result (e.g., the value returned to the application because of the compare-and-swap operation) to the expected value to determine if the compare-and-swap and message-add attempt has succeeded. If the value of the memory location is concurrently updated by another application (or another software thread, or by the NIC), the compare-and-swap would fail, and the value it returns to the application would indicate to the application that the write failed. In some embodiments, compare-and-swap may have a Boolean response (often referred to as a compare-and-set operation)

In some embodiments, the application may use a load-link/store-conditional (LL/SC) operation to add the message to the injection descriptor. An LL/SC operation is a pair of instructions used in multithreading to achieve synchronization. The load-link instruction returns the current value of a memory location, while the subsequent store-conditional instruction to the same memory location will store a new value (e.g., the message) only if no updates have occurred to that location since the load-link. In some embodiments, the store-conditional may provide a result (e.g., return a value) to the application indicating whether or not the store-conditional has succeeded. If the value stored at the memory location has changed (e.g., if another application or software thread added a message, or if the NIC locked the injection descriptor by changing the value at the cache line to all ones), the store-conditional will fail to add the message.

After attempting to add the message to the injection descriptor at operation 204, the application may determine whether the message was added successfully at decision block 206. The application may use a load-like AMO to determine whether the message was added successfully. The load-like AMO may request a return value indicating which cache line of the injection descriptor the message was stored in. If the message was not successfully added to the injection descriptor, the application may receive a return value indicating as such.

For example, the injection descriptor may have 16 associated cache lines (numbered 0 through 15). If the message was successfully stored, the cache line in which it was stored may be returned (e.g., the return value may be 7). If, however, the message was not successfully added, the application may receive a return value outside of 0-15 (e.g., the return value may be 16). If the message was not added successfully, the method 200 may return to operation 204, where the application may reattempt to add the message to the injection descriptor.

In some embodiments, if the message is not successfully added to the injection descriptor, the application may generate a second injection descriptor for the destination node. The application may then add the message to the second injection descriptor. In order to ensure that the NIC will process the messages added to the second injection descriptor, the application may add a pointer identifying the second injection descriptor into an injection FIFO buffer serviced by the NIC.

If, however, the application determines that the message was successfully added at decision block 206, the application may determine whether the message was the first one added to the injection descriptor at decision block 208. If the message was the first one added to the injection descriptor, the application may have to add a pointer identifying the injection descriptor into an injection queue serviced by a NIC so that the message gets transmitted to the destination node. There are many ways that the application may determine whether the message was the first added to the injection descriptor. For example, the application may use a store-and-load AMO to add the message to the injection descriptor. The store-and-load AMO may reply with a return value indicating which cache line in the injection descriptor the message was stored in. If the return value indicates that the message was stored in the first cache line (e.g., in cache line 0), the application may determine that the message was the first added to the injection descriptor.

If the application determines that the message was not the first added to the injection descriptor at decision block 208, the method 200 may end. If, however, the application determines that the message was the first one added to the injection descriptor at decision block 208, the application may add a pointer identifying the injection descriptor to an injection queue serviced by a NIC at operation 210 and the method 200 may end.

Figure 3:
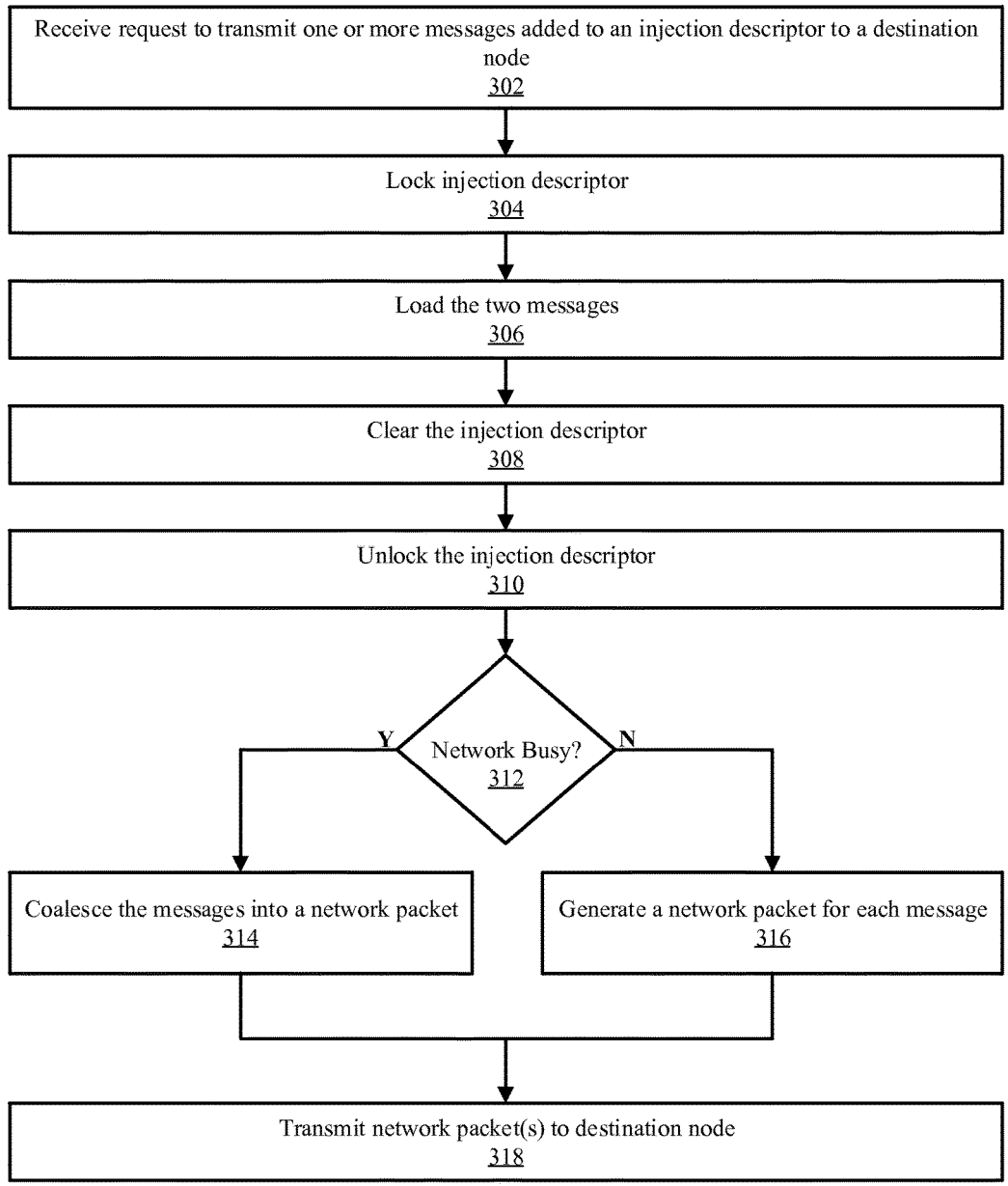
FIG. 3 illustrates an exemplary method for generating and transmitting network messages to a destination node, in accordance with embodiments of the present disclosure.

Referring now to FIG. 3, shown is an exemplary method 300 for generating and transmitting network messages to a destination node, in accordance with embodiments of the present disclosure. In some embodiments, the method 300 may be performed by a network interface controller (NIC). The NIC may perform the method 300 using hardware logic (e.g., one or more logic circuits), software, or a combination of the two. The method 300 may begin at operation 302, where a NIC may receive a request to transmit the two or more messages that were added to an injection descriptor to a destination node.

An application or software thread may have added the one or more messages to the injection descriptor in accordance with, e.g., the method 200 discussed in reference to FIG. 2. The application may add a pointer identifying the injection descriptor to an injection queue serviced by the NIC after adding a message to the injection descriptor. The injection queue may be a first-in, first-out (FIFO) data buffer in the NIC in which applications may add messages that they want injected into a network (e.g., transmitted to a destination node over a network). In some embodiments, the injection queue may be in the system memory instead of in the NIC. The NIC may determine that it received a request to transmit the one or more messages that were added to an injection descriptor to a destination node when the pointer identifying the injection descriptor is the next job to be processed in the injection queue.

After receiving a request to transmit the one or more messages that were added to an injection descriptor to a destination node at operation 302, the NIC may lock the injection descriptor at operation 304. In some embodiments, the NIC may set a flag in memory of the computer system to lock the injection descriptor. The flag may indicate to other hardware, applications, or software threads attempting to access the injection descriptor that the NIC is currently accessing the descriptor. When the flag is set, other hardware with DMA, applications, and software threads may be unable to access the injection descriptor.

In some embodiments, the NIC may use an atomic store-like memory operation to lock the injection descriptor. The NIC may fill all zeroed cache lines (e.g., all cache lines that do not include a message) for the injection descriptor to, e.g., all ones. When a software application attempts to add a new message to the injection descriptor, it will see that all cache lines for the injection descriptor are currently in use and the new message cannot be added. The software application will then respond accordingly (e.g., try again, make a new injection descriptor, add the message directly to the injection queue). Because the NIC may recognize that cache lines with a value of all ones is a fake message, when the NIC coalesces the messages it may skip the cache lines with all ones.

After locking the injection descriptor at operation 304, the NIC may load the content of the injection descriptor at operation 306. In some embodiments, the NIC may load the content of the injection descriptor to a NIC cache to be processed by logic circuitry on the NIC. In some embodiments, the NIC may not load the messages to the NIC cache before coalescing them into a network packet. Instead, the NIC may generate the network packet by loading the messages directly from the memory to which the application(s) or software thread(s) saved the one or more messages. In these embodiments, the NIC may not clear or unlock the injection descriptor, as discussed below, until after it has generated the network packet.

After loading the content of the injection descriptor to the NIC cache at operation 306, the NIC may clear the injection descriptor at operation 308. For example, in some embodiments the NIC may reset the value of all cache lines associated with the injection descriptor to all zeros.

After clearing the injection descriptor at operation 308, the NIC may unlock the injection descriptor at operation 310. In some embodiments, the NIC may clear the flag that it set in the memory so that other hardware or software may access the injection descriptor. In some embodiments, such as when the NIC locks the injection descriptor using a store-like atomic memory operation, the injection descriptor may be automatically unlocked when the NIC clears it. For example, if the NIC changes open cache lines to all ones to lock the injection descriptor, the injection descriptor will become unlocked when the NIC clears it by zeroing all of the cache lines.

After unlocking the injection descriptor at operation 310, the NIC may determine whether the network is busy at decision block 312. There are many ways that the NIC may determine that the network is busy. In some embodiments, the NIC may determine that the network is busy if there is a sent network packet for which the NIC has received no acknowledgement. In some embodiments, a time threshold may be used. For example, the NIC may determine that the network is busy if the NIC has not received an acknowledgement for a TCP/IP message that it transmitted to a destination node within a certain amount of time (e.g., within a time threshold) after sending it.

In some embodiments, the NIC may determine that the network is busy if there are a high number of TCP retransmissions. The NIC may compare the number of TCP retransmissions to a threshold and, if the number of TCP retransmissions exceeds the threshold, determine that the network is busy. The threshold may be set by a user or determined automatically by the NIC using historical data. For example, if the NIC normally retransmits 1% of all outgoing messages, the NIC (or a user) may establish a threshold of 3%. If the NIC is retransmitting less than 3% of all network packets, the NIC may determine that the network is not busy. If, however, the NIC is retransmitting 5% of all network packets, the NIC may determine that the network is busy.

In some embodiments, the NIC may consider the latency (e.g., the time it takes to send a network packet from a source node to a destination node), jitter (e.g., the variation in latency as measured in the variability over time of the packet latency across a network), and loss rate (e.g., the percentages of network packets that fail to reach their destination) of injected network packets when determining whether the network is busy. In some embodiment, the latency for injected network packets may be either one-way latency (i.e., the time from the source node to the destination node) or round-trip latency, also known as round-trip delay time (i.e., the one-way latency from the source node to the destination node plus the one-way latency from the destination node back to the source node). Each of the latency, jitter, and loss rate may be compared to a threshold. If one or more exceed their corresponding threshold, the NIC may determine that the network is busy. In some embodiments, the NIC may use a weighted formula comprising any or all of the above mentioned components to determine whether the network is busy.

Other methods for determining whether a network is busy are known to persons of ordinary skill in the art. The examples discussed herein are used for illustrative purposes only. The disclosure should not be limited to the exemplary methods for determining that the network is busy discussed herein, and all other methods consistent with this disclosure are contemplated.

If the NIC determines that the network is not busy at decision block 312, the NIC may generate a network packet for each message that was added to the injection descriptor at operation 316. It may be advantageous to generate a packet for each message when the network is not busy because the overhead performance cost of coalescing the messages into a single packet may be relatively high. Accordingly, if the network is free of congestion and there is no need to minimize the number of packets being sent, the lowest message latency and best application performance may be to send each message in its own packet. After generating a network packet for each message at operation 316, the NIC may transmit the network packet(s) to the destination node at operation 318 and the method 300 may end.

If the NIC determines that the network is busy at decision block 312, the NIC may coalesce the one or more messages that were added to the injection descriptor into a single network packet at operation 314. When the network is busy, the performance costs of coalescing messages may be outweighed by the benefits of more efficiently using the network. For example, if three TCP/IP messages are combined into a single packet, two 40 byte message headers may not need to be generated or transmitted over the network. This, along with the fact that fewer packets are being transmitted on the network, may help alleviate network congestion, or prevent the congestion from getting worse. Additionally, because the NIC is coalescing the messages instead of, e.g., a software application, the messages can be combined up to the last possible moment (e.g., up until the moment the NIC transmits the messages to the destination node). Message order may also be preserved if the applications are configured to add the message to the next available cache line associated with the injection descriptor.

Methods for coalescing one or more messages into a network packet are known to persons of ordinary skill in the art. For example, in some embodiments, the NIC may inject packets into a network using TCP/IP protocols. The NIC may generate a 40 byte TCP/IP header for the coalesced messaged; 20 bytes for the TCP header and 20 bytes for the IPv4 or IPv6 header. The NIC may then add the payload (e.g., the messages) to the network packet. Delimiters may be used to separate the individual messages within the network packet.

In some embodiments, the one or more messages that were added to the injection descriptor may be coalesced into two or more network packets at operation 314. This may be done if, for example, the combined size of the messages and any delimiters, padding, or offsets used to separate message exceeds the maximum segment size (e.g., the largest amount of data, often specified in octets, that a computer or communications device can receive in a single TCP segment, or packet) for the destination node. The maximum segment size for a computer does not generally include the size of the TCP or IP headers.

For example, the destination node may be an IPv4 host that has a maximum segment size of 536 octets. If the combined size of the messages added to an injection descriptor and any delimiters, padding, or offsets necessary to separate the messages does not exceed 536 octets, the NIC may coalesce all of the messages into a single network packet. If the combined size exceeds 536 octets, the NIC may coalesce the messages into two or more network packets.

After coalescing the one or more messages that were added to the injection descriptor into a network packet at operation 314, the NIC may transmit the network packet to the destination node at operation 318 and the method 300 may end.

Figure 4:
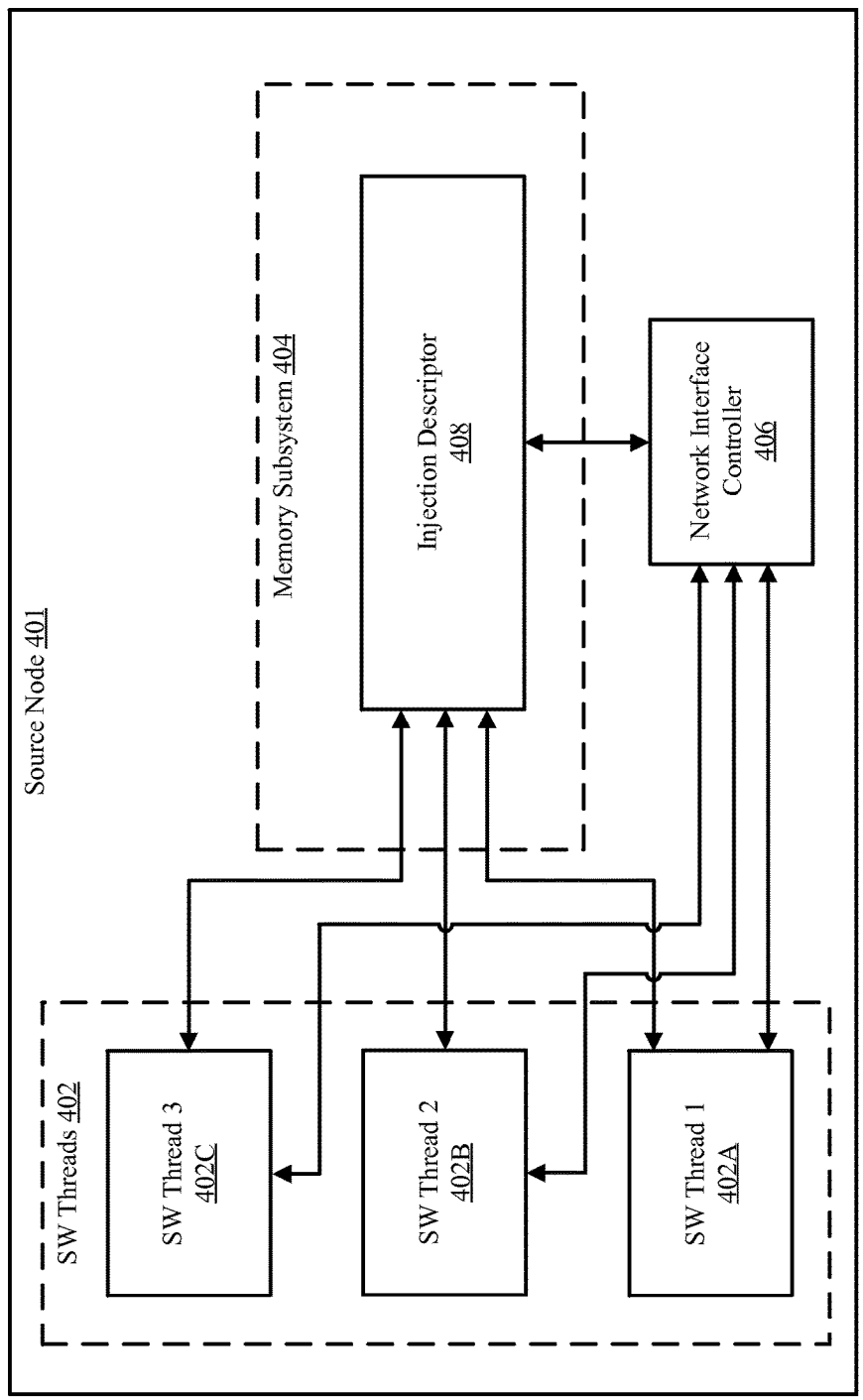
FIG. 4 illustrates a functional block diagram of an example source node which may generate and transmit network messages to a destination node, in accordance with embodiments of the present disclosure.

Referring now to FIG. 4, shown is a functional block diagram of an example source node 401 which may generate and transmit network messages to a destination node, in accordance with embodiments of the present disclosure. The source node 401 may include three software threads 402A, 402B, and 402C, collectively referred to as software threads 402, a memory subsystem 404, and a network interface controller (NIC) 406. The memory subsystem 404 may include an injection descriptor 408. The injection descriptor 408 may correspond to a particular destination node communicatively coupled with the source node 401.

The software threads 402 may be communicatively coupled to the memory subsystem 404 such that each of the software threads 402 may independently access the injection descriptor 408. The software threads 402 may also be communicatively coupled to the NIC 406, or to an injection queue (not shown) serviced by the NIC.

The NIC 406 may be have direct memory access (DMA) to the memory subsystem 404. Specifically, the NIC 406 may have DMA to the injection descriptor 408. The NIC 406 may be able to lock, unlock, read from, and write to the injection descriptor 408.

The source node 401 may be used to illustrate an example operation of embodiments of the present disclosure. The software threads 402 may, in some embodiments, implement the method 200 (discussed in reference to FIG. 2) in conjunction with the NIC 406 implementing the method 300 (discussed in reference to FIG. 3). For example, the first software thread 402A may generate a first message to be sent to a destination node. The first software thread 402A may attempt to add the first message to the injection descriptor 408 using a store-and-load atomic memory operation (AMO). The first software thread 402A may determine, based on the load operation, that the first message was successfully added to the injection descriptor 408 and that the first message is the only message added to the injection descriptor. Accordingly, the first software thread 402A may add a pointer identifying the injection descriptor 408 into an injection queue serviced by the NIC 406.

Subsequently, the second software thread 402B may generate a second message to send to the same destination node as the first message. The second software thread 402B may attempt to add the second message to the injection descriptor 408 using a store-and-load AMO. The second software thread 402B may determine, based on the load operation, that the second message was successfully added to the injection descriptor 408. Because the second message was added to the injection descriptor 408 after the first message was, the second software thread 402B may not have to add a pointer to the injection queue.

Subsequent to the second software thread 402B adding the second message to the injection descriptor 408, the NIC 406 may determine that it is to transmit the contents of the injection descriptor to the destination node. This may be done when the pointer identifying the injection descriptor 408 is the next item in the injection queue to be processed by the NIC. Accordingly, the NIC 406 may lock the injection descriptor 408 by, e.g., changing all of the empty memory addresses (e.g., cache lines) associated with the injection descriptor to all ones so that applications or software threads will be unable to add any additional messages to the injection descriptor.

After the NIC 406 locks the injection descriptor 408, the third software thread 402C may generate a third message to be sent to the destination node. The third software thread 402C may attempt to add the third message to the injection descriptor 408 using, e.g., a load-link/store-conditional operation. Because the NIC 406 has already locked the injection descriptor 408, the store-conditional operation may fail. The third software thread 402C may then react in one of several different ways. In some embodiments, the third software thread 402C may try again. In other embodiments, the third software thread 402C may create a second injection descriptor for the destination node in the memory subsystem 404 and may add the third message to the second injection descriptor. The third software thread 402C may then add a pointer identifying the second injection descriptor into the injection queue for the NIC 406. In some embodiments, the third software thread 402C may add the third message directly into the injection queue for the NIC 406 so that the third message is transmitted on its own (e.g., not coalesced with other messages).

Subsequent to, or simultaneously with, the third software thread 402C failing to add the third message to the injection descriptor 408, the NIC 406 may load the first and second messages into cache. The NIC 406 may then clear and unlock the injection descriptor, and then determine whether the network is busy. If the network is busy, the NIC 406 may coalesce the first and second messages and generate a network packet that contains the coalesced messages, and it may transmit the network packet to the destination node.

Figure 5:
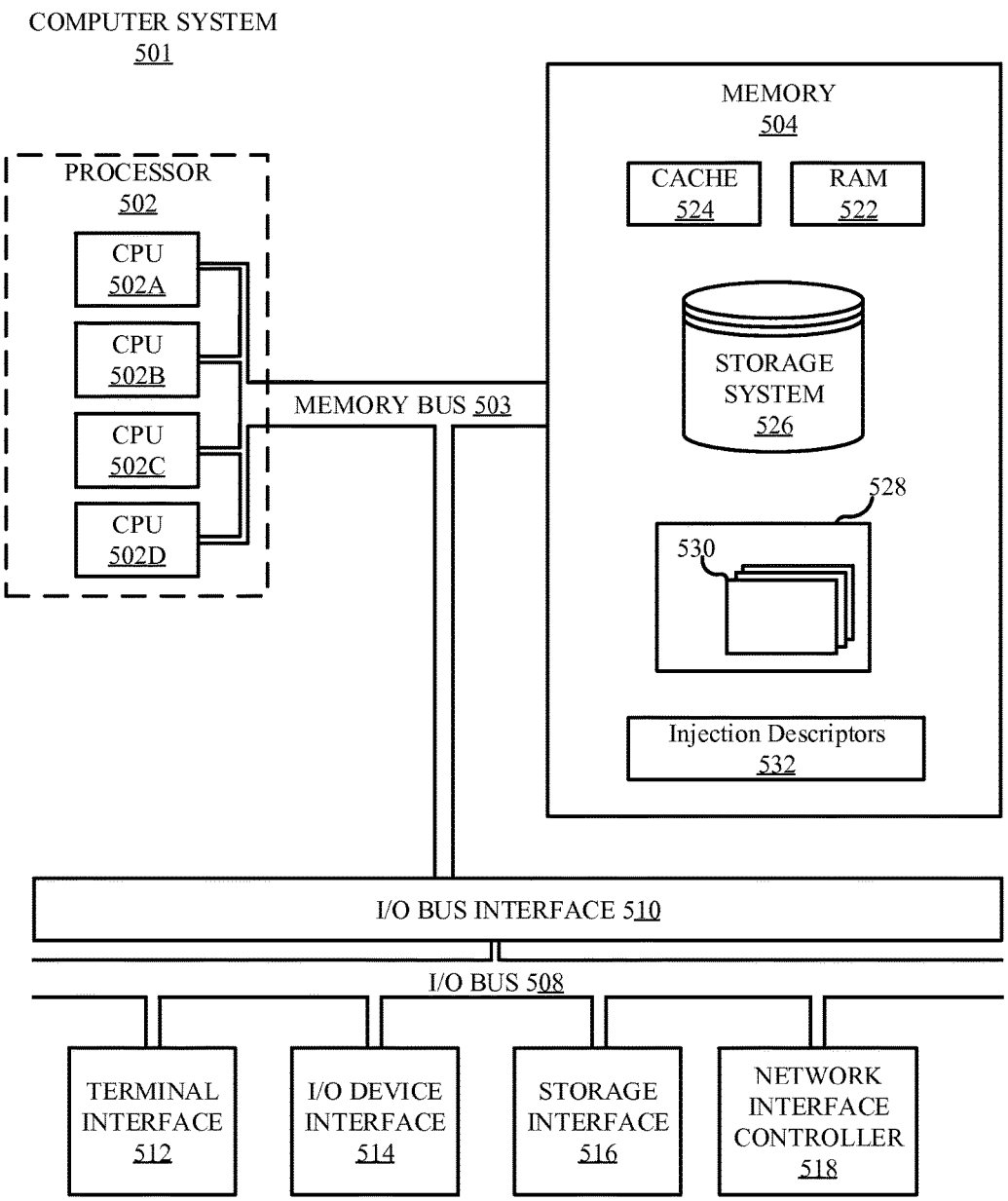
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, an I/O (Input/Output) device interface 514, a storage interface 516, and a network interface controller (NIC) 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

For example, the program modules 530 may include individual software threads relating to an application program. The software threads may process data and generate messages to send to destination nodes (e.g., other computer systems). The destination nodes may exist on a network with the computer system 501. The software threads may be configured to add the generated messages to one or more injection descriptors 532.

System Memory 504 may also contain one or more injection descriptors 532. The injection descriptors 532 may be data descriptors that identify messages to be sent to a particular destination node. Each of the injection descriptors 532 may correspond to a different destination node. In some embodiments, the injection descriptors 532 may include pointers to the location in memory where the added messages are stored. In other embodiments, the injection descriptors 532 may include the actual payloads (e.g., the messages) added by software applications or threads.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

The NIC 518 may be a network interface controller (also known as a network interface card) that has direct memory access (DMA) to the memory. Specifically, the NIC 518 may have DMA to the injection descriptors 532 stored in the memory 504. The NIC 518 may include logic circuitry, or software (such as a device driver) that enables the NIC to lock, unlock, load, write to, and read from the injection descriptors 532. The NIC 518 may also have logic circuitry or software that causes the NIC to coalesce one or more messages into a network packet.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer implemented method for coalescing messages, the method comprising:
   storing, in a memory, an injection descriptor, the injection descriptor corresponding to a destination node;
   determining, by a network interface controller (NIC), that two or more messages added to the injection descriptor are to be transmitted to the destination node, the NIC having direct memory access (DMA) to the memory;
   locking, by the NIC, the injection descriptor to prevent an additional message from being added to the injection descriptor;
   loading, by the NIC, the two or more messages;
   clearing, by the NIC and after loading the two or more messages, the injection descriptor;
   unlocking, by the NIC and after clearing the injection descriptor, the injection descriptor;
   determining whether the network is busy;
   in response to determining that the network is busy, generating, by the NIC, a network packet, the network packet including the two or more messages, and transmitting the network packet to the destination node; and
   in response to determining that the network is not busy, generating, by the NIC, a set of network packets, the set of network packets including a separate packet for each of the two or more messages, and transmitting, by the NIC, the set of network packets to the destination node.

2. The method of claim 1, wherein the generating, by the NIC, the network packet comprises coalescing the two or more messages.

3. The method of claim 1, the method further comprising:
generating, by an application, a message to be sent to the destination node; and
adding, by the application, the message to the injection descriptor.

4. The method of claim 3, the method further comprising:
determining, by the application, that the message is the only message added to the injection descriptor; and
adding, by the application, a pointer identifying the injection descriptor to an injection queue served by the NIC.

5. The method of claim 3, wherein the adding, by the application, the message to the injection descriptor comprises using a compare-and-swap (CAS) instruction.

6. The method of claim 3, wherein the adding, by the application, the message to the injection descriptor comprises using a load-link/store-conditional (LL/SC) instruction set.

7. The method of claim 1, wherein the locking the injection descriptor comprises setting a flag in the memory, the flag indicating that the NIC is accessing the injection descriptor.

8. The method of claim 1, wherein the locking the injection descriptor comprises using a store-like atomic memory operation (AMO).

9. A system for coalescing messages, the system comprising:
a memory having an injection descriptor, the injection descriptor corresponding to a destination node;
a network interface controller (NIC), wherein the NIC is configured to perform a method comprising:
determining that two or more messages added to the injection descriptor are to be transmitted to the destination node, the NIC having direct memory access (DMA) to the memory;
locking the injection descriptor to prevent an additional message from being added to the injection descriptor;
loading the two or more messages;
clearing, after loading the two or more messages, the injection descriptor;
unlocking, after clearing the injection descriptor, the injection descriptor;
determining whether the network is busy;
in response to determining that the network is busy, generating a network packet, the network packet including the two or more messages, and transmitting the network packet to the destination node; and
in response to determining that the network is not busy, generating a network packet for each of the two or more messages, and transmitting the two or more network packets to the destination node.

10. The system of claim 9, wherein the generating the network packet comprises coalescing the two or more messages.

11. The system of claim 9, wherein the system further includes a processor, the processor being configured to:
generate a message to be sent to the destination node; and
add the message to the injection descriptor.

12. The system of claim 11, wherein the processor is further configured to:
determine that the message is the only message added to the injection descriptor; and
add a pointer identifying the injection descriptor to an injection queue served by the NIC.

13. The system of claim 11, wherein the processor is configured to add the message to the injection descriptor using a compare-and-swap (CAS) instruction.

14. The system of claim 11, wherein the processor is configured to add the message to the injection descriptor using a load-link/store-conditional (LL/SC) instruction set.

15. A computer program product for coalescing messages, the computer program product comprising a computer readable storage medium having program instructions embodied therewith, wherein the computer readable storage medium is not a transitory signal per se, the program instruction executable by a network interface controller (NIC) to cause the NIC to perform a method comprising:
storing, in a memory, an injection descriptor, the injection descriptor corresponding to a destination node;
determining that two or more messages added to the injection descriptor are to be transmitted to the destination node, the NIC having direct memory access (DMA) to the memory;
locking the injection descriptor to prevent an additional message from being added to the injection descriptor;
loading the two or more messages;
clearing, after loading the two or more messages, the injection descriptor;
unlocking, after clearing the injection descriptor, the injection descriptor;
determining whether the network is busy;
in response to determining that the network is busy, generating a network packet, the network packet including the two or more messages, and transmitting the network packet to the destination node; and
in response to determining that the network is not busy, generating a network packet for each of the two or more messages, and transmitting the two or more network packets to the destination node.

16. The computer program product of claim 15, wherein the generating the network packet comprises coalescing the two or more messages.

17. The computer program product of claim 15, wherein the locking the injection descriptor comprises setting a flag in the memory, the flag indicating that the NIC is accessing the injection descriptor.

18. The computer program product of claim 15, wherein the locking the injection descriptor comprises using a store-like atomic memory operation (AMO).

* * * * *